United States Patent [19]
Anderberg

[11] Patent Number: 5,462,289
[45] Date of Patent: Oct. 31, 1995

[54] SEALING ARRANGEMENT AT LEAD-THROUGH SHAFTS

[76] Inventor: Göran Anderberg, 261 61 Landskrona, Strandvägen 303, Sweden

[21] Appl. No.: 47,230

[22] Filed: Apr. 14, 1993

[51] Int. Cl.$^6$ .................................................. F16J 15/10
[52] U.S. Cl. ............................................. 277/65; 277/171
[58] Field of Search .................................. 277/37, 38, 65, 277/85, 131, 132, 170, 171, 172, 187

[56] References Cited

U.S. PATENT DOCUMENTS

| | | | |
|---|---|---|---|
| 2,642,016 | 6/1953 | Thalmann | 277/171 X |
| 2,912,264 | 11/1959 | Peck | 277/171 X |
| 3,354,786 | 11/1967 | Bedford | 277/171 X |
| 3,440,122 | 4/1969 | McCormick | 277/37 X |
| 4,648,740 | 3/1987 | Carlson | 277/170 X |
| 5,029,878 | 7/1991 | Ray | 277/170 |

FOREIGN PATENT DOCUMENTS

| | | | |
|---|---|---|---|
| 550642 | 12/1957 | Canada | 277/65 |
| 1329274 | 12/1963 | France | 277/65 |
| 1653729 | 12/1971 | Germany . | |
| 2252137 | 7/1992 | United Kingdom | 277/170 |

*Primary Examiner*—William A. Cuchlinski, Jr.
*Assistant Examiner*—John L. Beres
*Attorney, Agent, or Firm*—Ladas & Parry

[57] ABSTRACT

A hygienic sealing arrangement for a leadthrough shaft passing through a cover (4) for use in the food industry or the like in which an outer seal ring (1) and an inner seal ring (2) are bonded to the cover (4) by vulcanization. Upon assembly, the side of the outer seal ring (1) facing the medium to be sealed off is somewhat compressed because its contact surfaces (6, 7) in the cover (4) and the adjoining wall (5), respectively, converge toward the medium side. The inner seal ring is in the form of a lip seal (2) and bears against a part (3) of the lead-through shaft which part (3) can move somewhat back and forth but which does not rotate. The side face of the lip seal (2) is exposed to the medium being sealed off of arcuate curvature to form a recess so that the edge of the lip is pressed against the abutting surface by the pressure (P) of the product in the recess.

11 Claims, 2 Drawing Sheets

SEALING ARRANGEMENT AT LEAD-THROUGH SHAFTS

FIELD OF THE INVENTION

The present invention relates to a sealing arrangement at lead-through shafts by which a hygienical sealing of an aggressive medium inside a container or the like is achieved. The sealing arrangement is primarily intended for the food industry, but is of course applicable within other areas as well. The sealing arrangement including a cover can be arranged, for example, lead-through shafts in pumps or mixers.

BACKGROUND

It is important within the food industry to avoid as far as possible that the often very aggressive medium is allowed to accumulate in seal pockets, slots or the like. Furthermore it is an advantage if the parts which might come in contact with the medium are easy to clean. Possible accumulations of the sealed medium often very rapidly form colonies of bacteria within the food industry, which of course is unacceptable.

Thus, from the medium side there shall be no slits, cavities or other spaces into which the medium can penetrate and accumulate in dirt pockets, which may be difficult to clean.

Current seals normally used for lead-through shafts are not designed from the viewpoint of avoiding that the sealed medium in any way accumulate in the sealing arrangement. Instead they have recesses, slots or the like, in which any sealing element is placed. However, these recesses, slots or the like at the same time constitute dirt pockets for the sealed medium, which is unacceptable within e.g. the food industry.

SUMMARY OF THE INVENTION

An object of the present invention is to form a sealing arrangement for a cover, at lead-through shafts, to a space containing an aggressive medium in in a hygienic and safe way.

Another object is that the cover and adjoining parts shall be easy to clean.

These objects are achieved by a sealing arrangement according to the invention in which two seal rings are provided on a cover to seal the pressure space containing the product and the seal rings are formed with smooth faces devoid of recesses and slots and adapted to increase the sealing effect under the pressure in said space.

In one embodiment, one seal ring is squeezed upon assembly of the embodiment at the end where its surface is exposed to the pressure space and the other seal ring is a lip seal which has an arcuate recess exposed to the pressure space to press the lip seal into engagement with its supporting member.

Additional advantages and objects of the present invention will become apparent by reference to the following detailed description of one embodiment of the invention.

BRIEF DESCRIPTION OF THE DRAWINGS

In the enclosed drawings

DETAILED DESCRIPTION

Figure 1A:
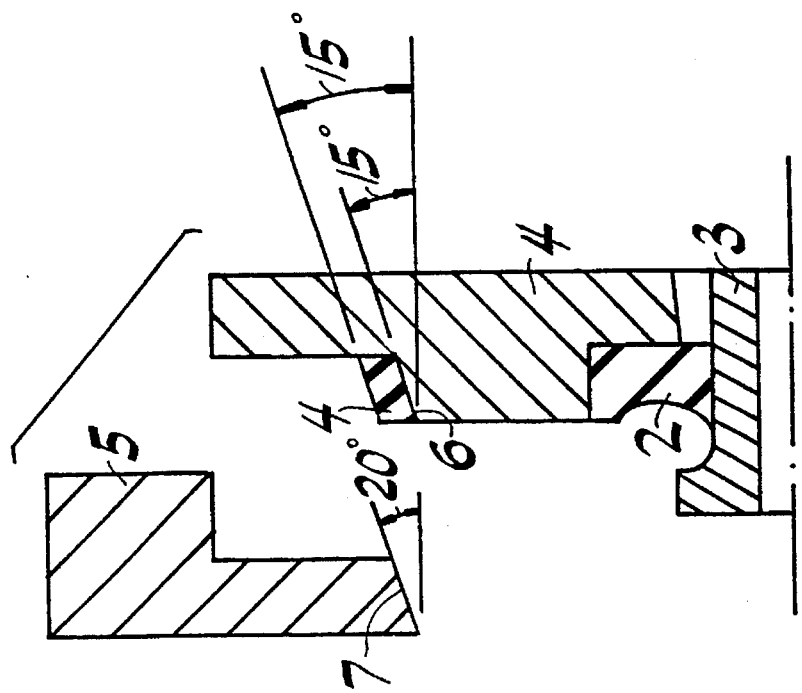
FIG. 1A shows the embodiment of FIG. 1 in unassembled state.

Two sealing elements 1, 2 are arranged in order to seal a cover 4 which is placed in a wall 5 or the like of a machine in connection with a lead-through shaft. The outer seal element 1 forms a seal between the wall 5 and the cover 4, while the inner seal element 2 forms a seal between the cover 4 and a silicon ring 3 of the lead-through shaft. The silicon ring 3 does not rotate but can move somewhat back and forth.

There is a medium under pressure P within the machine which medium is to be prevented from penetrating through the cover.

The outer seal element consists of a seal ring, which has uniform thickness when not in a pressurized state. This is illustrated in FIG. 1A. Preferably the seal ring is made of rubber or any material with corresponding qualities. In the initial position the seal ring 1 has different radii at the two edges, seen in section, so the upper and lower edges form an angle of 15° relative to a horizontal plane. In order to increase the sealing effect the seal ring 1 is somewhat squeezed at the side subjected to the pressure P. This is achieved by making the abutting face 6 of the cover for the seal ring 1 form an angle of 15° to relative horizontal plane, while the opposite abutting face 7 of the wall 5 forms an angle of 20° to relative horizontal plane. Thus, the space between the cover 4 and the wall 5 is narrower at the pressure side, which means that the seal ring 1 will be somewhat compressed at that side. The above angles are only examples of suitable angles of one embodiment, but the difference between the two angles is preferably about 5°.

The inner seal element 2, which is to seal between the cover 4 and the silicon ring 3 consists of a lip seal. The lip seal is preferably made of rubber or other material with corresponding characteristics.

Figure 1:
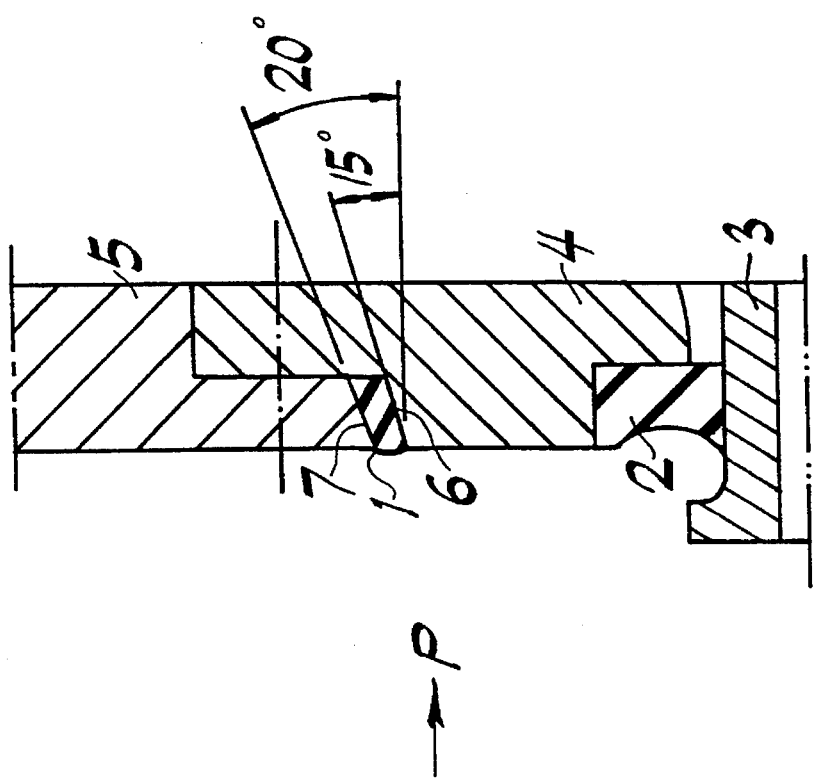
FIG. 1 shows one presently preferred embodiment of the invention, in section in assembly state. Only the upper part is shown as the cover and the sealing elements are circular.

The lip seal 2 has a lip edge pressed against the silicon ring 3 by the pressure P of the product, which enhances the sealing effect. As seen in FIG. 1 the side surface of lip seal 2 exposed to the pressure P has an arcuate curvature to form a recess to produce the pressure of the surfaces of the lip seal against the ring 3 as well as against the abutting surface of cover 4. Hereby it is also avoided that particles accumulate on or adjacent to the sealing element 2 itself, which means that it is not exposed to unnecessary wear due to accumulated particles. As the silicon ring 3 can move somewhat back and forth, depending for instance on unbalance of the shaft, the lip seal 2 must be able to accommodate these movements, which normally are relatively limited.

As this sealing arrangement is intended, for example, for use within the food industry, it is of great importance that no unnecessary spaces are formed, such as slots, pockets, slits or the like, in which the sealed medium can possibly accumulate. For this reason the abutting surfaces of both the sealing elements 1, 2 in the cover 4 and the wall 5, respectively, and the contact surfaces between the cover 4 and the wall are flat surfaces without any recesses, slots etc. This means that both the cover 4 and adjacent parts will be easy to clean and also to keep clean after mounting of the sealing arrangement.

Both the seal elements, i.e., the seal ring 1 and the lip seal 2, are preferably secured to the cover 4 by means of vulcanization. However, it is possible to use other suitable means, such as an adhesive which does not affect or is not affected by the sealed medium upon contact therewith.

The cover 4 is secured in the customary way in the wall 5, but as this constitute no part of the invention it is not shown here.

Figure 2:
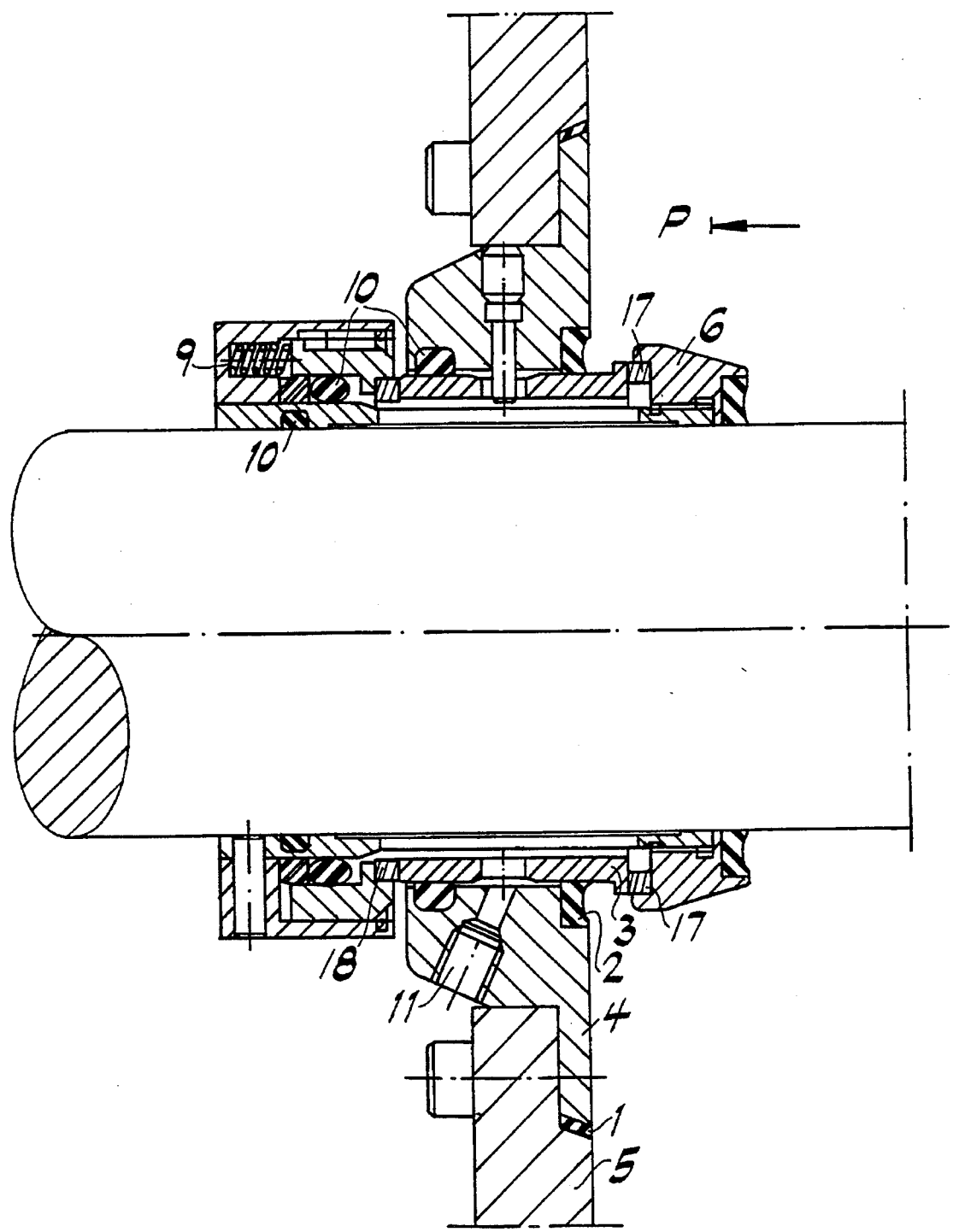
FIG. 2 shows a practical example of how the invention is used.

FIG. 2 shows a sealing arrangement with a shaft packing 6 according to the same applicant's U.S. patent application Ser. No. 923 911 (PCT/SE91/00187). Briefly the shaft packing 6 consists of an inner seal 7 and an outer seal 8, which are biased by means of a spring arrangement 9 against the silicon ring 3. Furthermore, the shaft packing includes a number of secondary sealing elements 10. Moreover, a flushing space 11 is provided in order to lubricate the inner and outer seals 7, 8 and their slide surfaces. The flushing is intended to remove particles that possibly are released during the rotation of the shaft.

I claim:

1. A sealing arrangement for a shaft extending from a product space under pressure, comprising a cover exposed to the pressure in the product space, radially outer and inner seal rings on said cover facing the product space, said outer seal ring being of uniform thickness in a non-pressurized state, said outer seal ring having a region adjacent to said space which is radially compressed upon assembly in the sealing arrangement, said cover having a surface to which the outer seal ring is bonded by vulcanization, said surface forming an angle of about 15° relative to a horizontal plane, and a wall having a surface abutting against an opposite surface of the outer seal ring, said surface of the wall forming an angle of about 20° relative to a horizontal plane so that radial compression is applied to said region of the outer seal ring when said wall and said cover are assembled with the outer seal ring therebetween.

2. A sealing arrangement as claimed in claim 1, wherein said cover has completely smooth surfaces without slots or recesses.

3. A sealing arrangement as claimed in claim 1, wherein said seal rings are made of rubber.

4. A sealing arrangement as claimed in claim 3, wherein the inner seal ring is bonded to said cover by vulcanization.

5. A sealing arrangement as claimed in claim 1, wherein said surfaces of said wall and said cover converge towards said product space.

6. A sealing arrangement for a shaft extending from a product space under pressure, comprising a cover exposed to the pressure in the product space, radially outer and inner seal rings on said cover facing the product space, said outer seal ring being of uniform thickness in a non-pressurized state, said outer seal ring having a region adjacent to said space which is radially compressed upon assembly in the sealing arrangement, said cover having a surface to which the outer seal ring is bonded by vulcanization, said surface forming an angle relative to a horizontal plane, and a wall having a surface abutting against an opposite surface of the outer seal ring, said surface of the wall forming an angle relative to a horizontal plane of about 5° more than said angle of the surface of the cover relative to a horizontal plane so that radial compression is applied to said region of the outer seal ring when said wall and said cover are assembled with the outer seal ring therebetween.

7. A sealing arrangement as claimed in claim 6, wherein said cover has completely smooth surfaces without slots or recesses.

8. A sealing arrangement as claimed in claim 6, wherein said seal rings are made of rubber.

9. A sealing arrangement as claimed in claim 8, wherein the inner seal ring is bonded to said cover by vulcanization.

10. A sealing arrangement as claimed in claim 6, wherein said surfaces of said wall and said cover converge towards said product space.

11. A sealing arrangement for a shaft extending from a product space under pressure, comprising a cover exposed to the pressure in the product space, radially outer and inner seal rings on said cover facing the product space, said outer seal ring being Of uniform thickness in a non-pressurized state, said outer seal ring having a region adjacent to said space, which is radially compressed upon assembly in the sealing arrangement, said inner seal ring comprising a lip seal interposed between said cover and a non-rotating element disposed around the shaft for limited back and forth movement relative thereto, said lid seal being in sealing contact with said cover and said non-rotating element, said lip seal having an edge surface exposed to the pressure in said space, said edge surface having an arcuate curvature to form a recess so that the pressure in said space will press the lip seal into contact with said cover and said non-rotating element, said outer seal ring being fitted between a surface on said cover and a surface of an adjoining wall, the surface of the cover and the surface of the adjoining wall being respectively inclined, relative to a horizontal plane at angles which differ from one another by about 5°, said surfaces converging towards said product space so that radial compression is applied to said region of the outer seal ring adjacent to said product space when said wall and said cover are assembled with the outer seal ring therebetween.

\* \* \* \* \*